United States Patent [19]

Hangmann

[11] Patent Number: 5,770,067
[45] Date of Patent: Jun. 23, 1998

[54] DEVICE FOR FILTERING A FLUID

[75] Inventor: Manfred Hangmann, Greven, Germany

[73] Assignee: Wil-Man Polymer Filtration GmbH, Wettringen, Germany

[21] Appl. No.: 763,204

[22] Filed: Dec. 11, 1996

[30] Foreign Application Priority Data

Mar. 29, 1996 [DE] Germany ..................... 196 12 790.4

[51] Int. Cl.[6] .......................... B01D 29/96; B01D 29/52; B01D 29/68; B29C 47/68

[52] U.S. Cl. .................. 210/236; 210/330; 210/333.01; 210/333.1; 425/197; 425/199

[58] Field of Search .................... 210/236, 330, 210/333.1, 333.01; 425/197, 199

[56] References Cited

U.S. PATENT DOCUMENTS

| | | |
|---|---|---|
| 4,395,212 | 7/1983 | Lambertus . |
| 4,725,215 | 2/1988 | Kreyenborg . |
| 5,090,887 | 2/1992 | Gneuss . |
| 5,200,077 | 4/1993 | McNeice . |
| 5,407,586 | 4/1995 | Gneuss . |
| 5,417,856 | 5/1995 | Bacher . |
| 5,417,866 | 5/1995 | Trott . |
| 5,498,334 | 3/1996 | Gneuss . |
| 5,578,206 | 11/1996 | Ogoshi . |

FOREIGN PATENT DOCUMENTS

| | | |
|---|---|---|
| 0 314 024 B1 | 4/1993 | European Pat. Off. . |
| 0 540 546 B1 | 9/1994 | European Pat. Off. . |
| 195 19 907 C2 | 12/1996 | Germany . |

OTHER PUBLICATIONS

"Anlage HA1", Technische Beschreibung, Einsatz des Schmelzefilter Typ KSS; (1995) Kreyenborg GmbH, Sep. 20, 1995, G. Niebl, p. 1.

*Primary Examiner*—Thomas M. Lithgow
*Attorney, Agent, or Firm*—Meltzer, Lippe, Goldstein, Wolf & Schlissel, P.C.

[57] ABSTRACT

A device for filtering a fluid, particularly a molten plastic, with a fluid-supplying canal and a fluid-draining canal is described, whereby two plate-like filters are movably arranged in and across the flow direction of the fluid to be filtered between the fluid-supplying canal and the fluid-draining canal. Hereby the fluid-supplying canal (4) is connected with the fluid-draining canal (5) by a single connecting canal (6). This single connecting canal (6) comprises a funnel-shaped extension (13) taking up the at least two filters (7, 8), whereby the at least two filters (7, 8) are simultaneously movable between a first position in which the at least two filters (7, 8) filter the fluid and a second position in which at least one filter (7; 8) of the at least two filters (7, 8) is superfused in the opposite flow direction (14) of the fluid during the filtering process, whereas the other filter (7; 8), respectively the other filters, filters, respectively filter, the fluid, whereby in this second position of the at least two filters (7, 8) the fluid can be drained out of the device into the atmosphere.

11 Claims, 6 Drawing Sheets

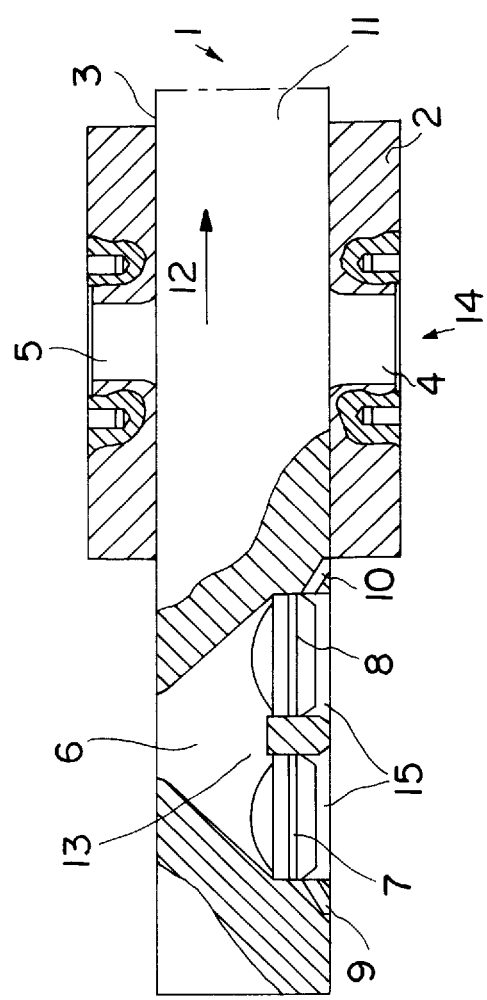
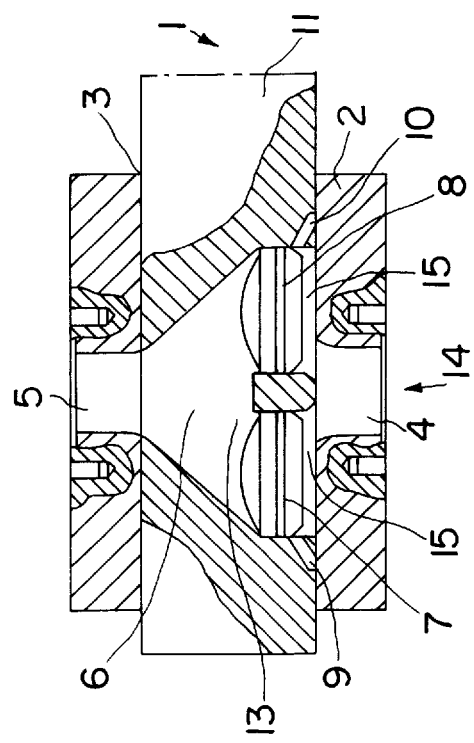

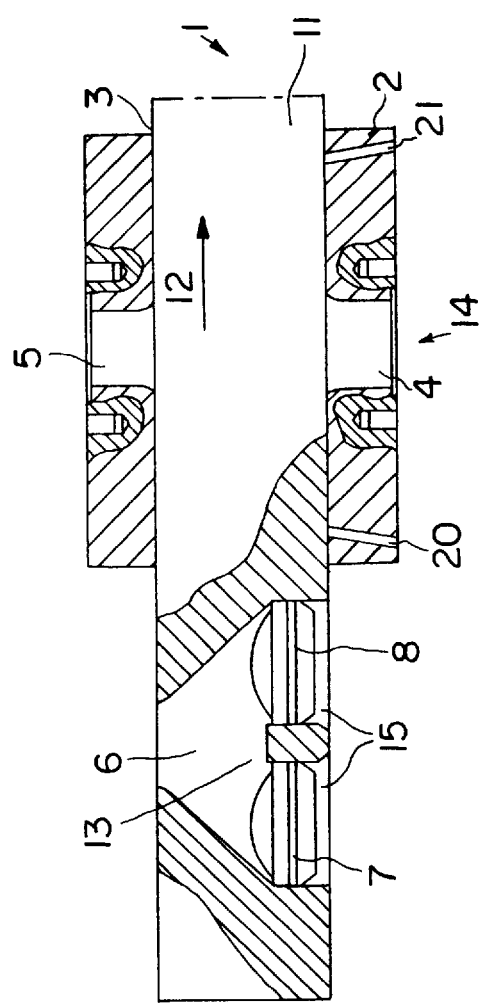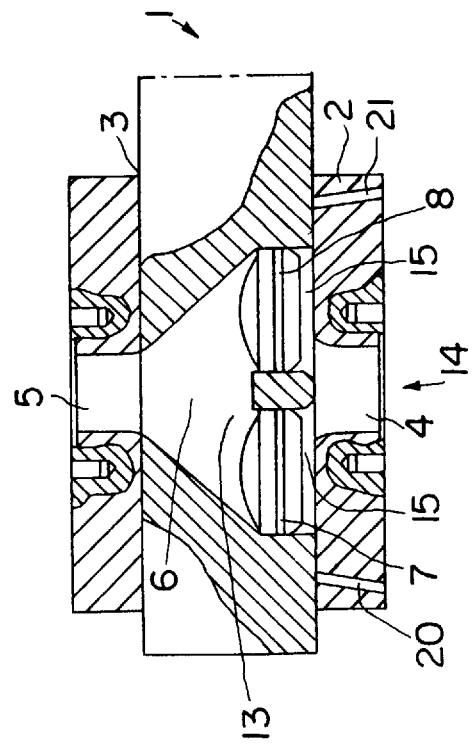

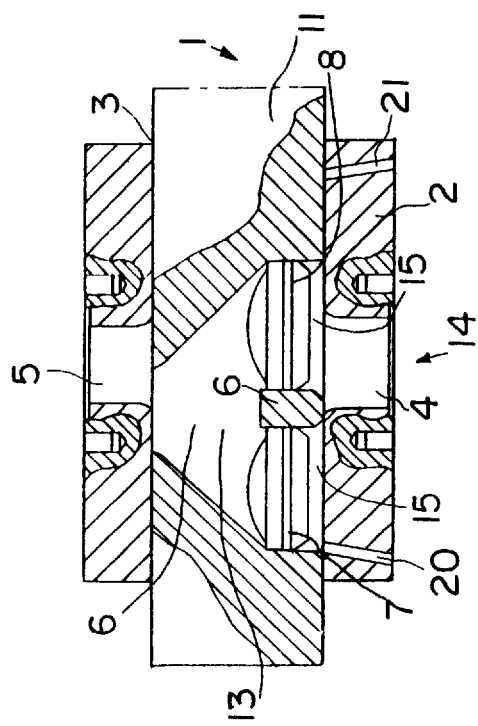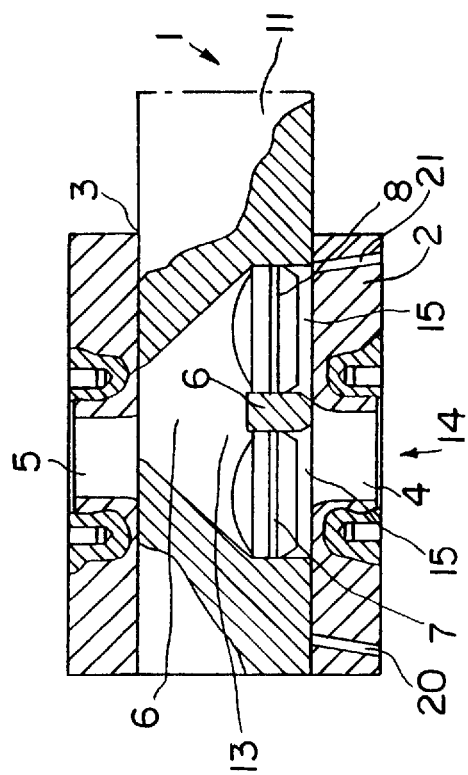

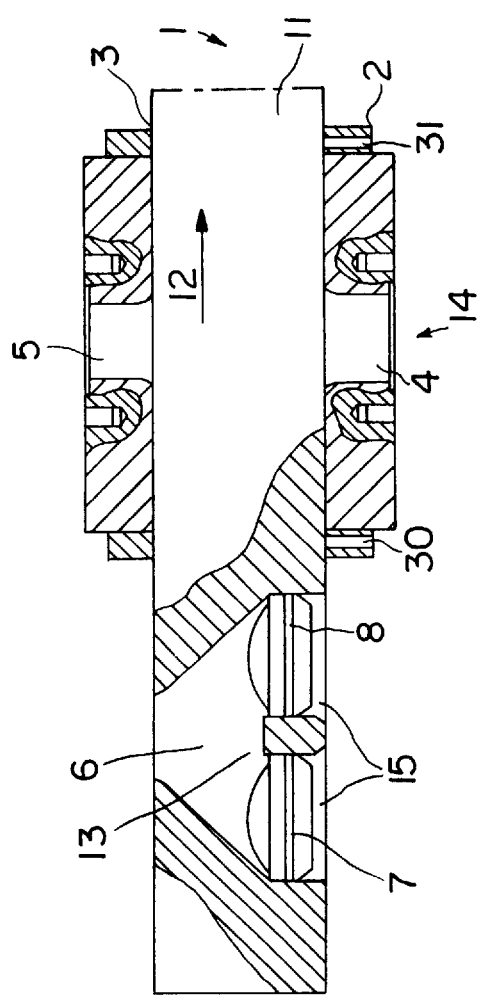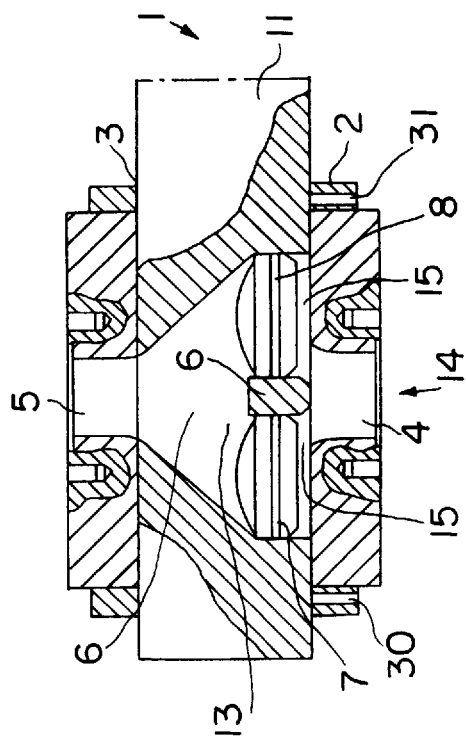

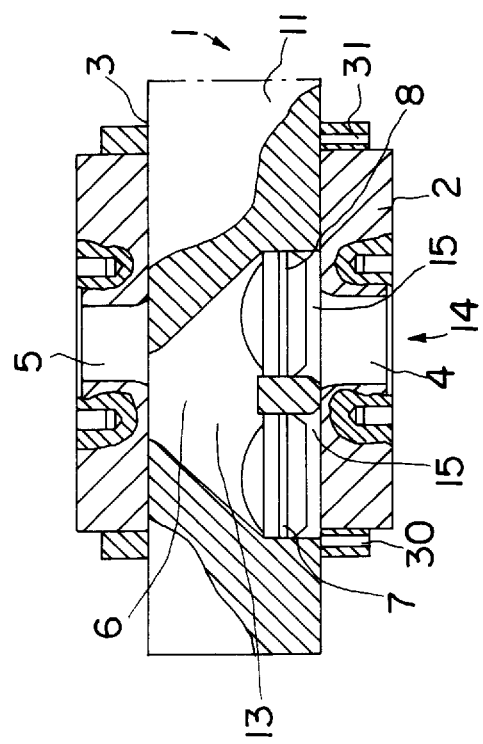
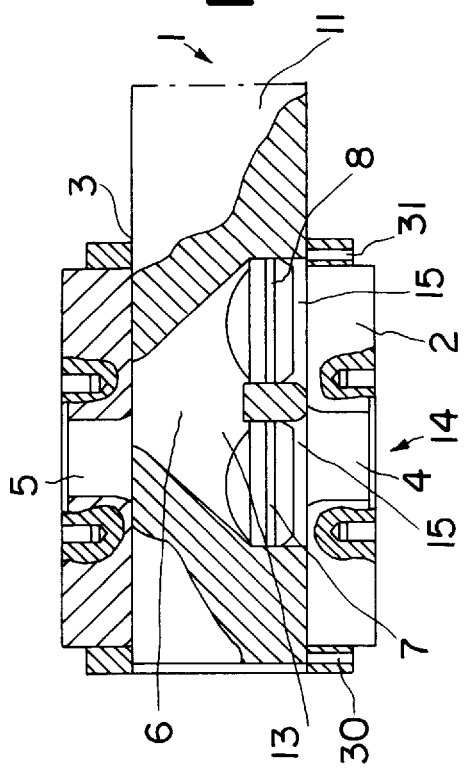

DEVICE FOR FILTERING A FLUID

The present invention concerns a device for filtering a fluid.

To clear fluids, particularly molten plastics, of undesired foreign particles disturbing the further treatment, it is known that such fluids are led through corresponding devices comprising filters. For example in respect to plastic treatment, the molten plastic flows through a filtering device, whereby this filtering device is generally positioned in the flow direction in that way that it is arranged downstream of the extruder, relative to the flow direction of the plastic to be filtered, before the corresponding tool or before a nozzle.

A filtering device with the features of the generic part of patent claim 1 is known from the DE 35 27 173. Hereby the known filtering device comprises a fluid-supplying canal for filtering molten plastic downstream of the extruder, relative to the flow direction of the plastic, whereby four connecting canals branch from the fluid-supplying canal. A plate-like filter extending across the flow direction of the plastic to be filtered is arranged in each connecting canal. The four connecting canals run downstream of the plate-like filters into a common fluid-draining canal.

Conditioned by the fact that the known filtering device comprises two filters each being arranged in pairs and in a movable position, this known filtering device allows the exchange of a pair of filters during the operation in order to clean the filters. Herefore it is necessary to remove the pair of filters to be exchanged from the housing, whereby in this moment the fluid flow is interrupted in the two connecting canals directed to these two filters, so that the remaining pair of filters filters the passing plastic flow and thus maintains the production.

This known device, however, shows the disadvantage that it is necessary to frequently exchange the plate-like filters within only a few minutes, if the plastics are extremely soiled as for example plastics to be recycled, which requires a crucial need of staff.

The present invention has the object to dispose a filtering device of the indicated sort being operable particularly simple and with few staff.

This object is achieved, by the present invention.

The inventive device for filtering a fluid, particularly a liquefied or molten plastic, comprises a fluid-supplying canal and a fluid-draining canal, as the above mentioned prior art. Different from the afore described device, the fluid-supplying canal is connected in the inventive device with the fluid-draining canal by only one single connecting canal, whereby this single connecting canal comprises a funnel-shaped extension to take up the at least two plate-like filters being essentially adjusted across the flow direction of the fluid in the connecting canal, whereby said fluid is to be filtered. The at least two filters moreover can be moved simultaneously between a first position in which the at least two filters filter the fluid and a second position in which at least one filter of the at least two filters is superfused in the opposite flow direction of the fluid in the connecting canal during the filtering process, whereas at that time the other filter, respectively the other filters, filters, respectively filter, the fluid, whereby in this second position of the at least two filters the fluid can be drained out of the device into the atmosphere.

The inventive device shows a lot of advantages. Firstly it is to be noted that the staff required for operating the inventive device is crucially reduced compared to the initially described device, which is depends on the fact that the endurance of the plate-like filters in the operation of the inventive device is multiplied, so that in the inventive device the exchange of filters occurs relatively seldom or after essentially longer time periods. This depends on the fact that in the second position of the at least two filters, at least one filter is superfused in the opposite flow direction of the fluid during the filtering process, which leads to the fact that in this second position of the at least two filters the particles, that are deposited on the filter surfaces facing the fluid-supplying canal, are drained into the atmosphere, which in the following is also called backwashing or regeneration. In the inventive device this backwashing procedure can be automated, so that the operating staff only has to control the backwashing procedure without having to exchange themselves the filters.

Furthermore it was observed that the inventive device can be manufactured in a simpler way than the known device, since for the inventive device only a single connecting canal has to be manufactured that itself aligns with the fluid-supplying canal and the fluid-draining canal, whereas in the known device four partial canals are required, each being specifically formed and having to be aligned with the fluid-supplying canal and the fluid-draining canal in that way, that neither borderings nor edges occur that cause an undesired intermingling of the fluid and thus a irregular superfusion and an irregular superfusing fluid amount per unit of time in the single partial canals. Conditioned by the fact that the inventive device comprises only one single connecting canal provided with a corresponding funnel-shaped extension, the cross section of this single connecting canal is considerably larger than the cross section of a partial canal provided in the known device, so that the single connecting canal arranged in the inventive device can not get plugged with dirt particles or with cracked plastic or solidified plastic. On one hand this increases the operating security of the inventive device compared to the known device and on the other hand an operation being relatively immune to interferences is made possible.

Additionally to the afore described two positions between which the at least two filters can be moved, the at least two filters can moreover be brought into a position in which the filters are located outside of the device, so that they are correspondingly exchangeable and replaceable by new filters.

A further development of the above described inventive device comprises one single connecting canal in which only two filters are arranged. Hereby these two filters can be moved between the afore described first and second positions in that way that optionally both filters simultaneously filter the fluid (first position) or that the first filter filters the fluid, whereas in this moment the second filter is superfused with the filtered fluid opposite to the flow direction during the filtering process, so that hereby the second filter is regenerated. As soon as the second filter is regenerated and a regeneration of the first filter is necessary, the second filter is used for filtering the fluid, whereas then the first filter is superfused with the filtered fluid in the opposite flow direction relative to the flow direction during the filtering process, in order to thus regenerate also the first filter.

In respect to the direction of the larger diameter of the funnel-shaped extension in the connecting canal, two possible ways exist. The larger diameter of the funnel-shaped extension of the connecting canal can, for example, face the fluid-draining canal, whereby, however, it was observed to be advantageous, when the connecting canal is arranged between the fluid-supplying canal and the fluid-draining canal in that way that the larger diameter of the funnel-shaped extension of the connecting canal faces the fluid-supplying canal, as this is subsequently shown and described in the concrete embodiments of the inventive device.

In order to move the at least two filters from the first into the second position and vice-versa, the at least two filters can be arranged in a rotary position in the funnel-shaped extension of the connecting canal in that way that the rotational axis essentially extends in the flow direction of the fluid to be filtered. However, it is particularly suitable when the at least two filters are arranged in a shiftable position across the flow direction of the fluid to be filtered, whereby such a shiftable position of the at least two filters can be simply caused by pneumatic and particularly hydraulic means.

A particularly suitable and thus preferred embodiment of the inventive device is characterized in that the connecting canal is arranged in a cylindrical bolt, whereby the fluid tight bolt is fixed in a housing bore extending vertically to the flow direction of the fluid from the fluid-supplying canal to the fluid-draining canal. Hereby the connecting canal extends over the whole diameter of the bolt, whereby the bolt can be shifted in the housing across the flow direction of the fluid to be filtered, in such a way that the at least two filters can be changed from the first position to the second position and vice-versa by shifting the bolt. By axially shifting the bolt in the housing bore, this embodiment of the inventive device thus allows in a simple manner that either the at least two filters can be brought into the first position in which both filters are simultaneously superfused with the fluid to be filtered, or into the second position in which at least one filter of the at least two filter can be backwashed, whereas the at least one other filter filters, or into a further position in which the filters can be exchanged.

In the second position of the at least two filters (position of regeneration) of the inventive device, to make a regular drainage of the fluid, that contains soiled particles emerging from the filter surface, into the atmosphere possible a further development of the afore described embodiments of the inventive device provides at least one canal for draining the fluid from the device, whereby the at least one drain canal connects a section of the connecting canal, this section being located upstream of the at least one filter, with the atmosphere. In other words, a section of the connecting canal located between the fluid-supplying canal and the filter is connected with the atmosphere by means of this drain canal.

To reduce in the afore described development of the inventive device the length of the at least one drain canal, each filter has a drain canal.

In respect to the arrangement of this drain canal several possibilities exist. The drain canal can be arranged, for example, within the bolt comprising the connecting canal and the at least two filters arranged therein, so that during an axial shifting of the bolt into the second position, the outlet of this drain canal is opened to the atmosphere.

The second possibility to position the drain canal provides that the drain canal is arranged in the housing section of the device in which also the fluid-supplying canal is arranged. If in this embodiment the connecting canal and the at least two filters arranged therein are located in the above described bolt, then the section of the connecting canal, the section being positioned upstream of each filter, can be connected with the drain canal by an axial shifting of the bolt relative to its bore, so that correspondingly in this position of regeneration, the fluid that contains soiled particles emerging from the filter surface is drained into the atmosphere. It is also possible to provide the drain canal with a corresponding stop valve, in such a way that the section located upstream of each filter to be cleaned is connected with the atmosphere only in the position of regeneration (second position).

According to a third possibility, the drain canal is arranged at the outside of the housing section in which the fluid-supplying canal is located, as this is subsequently described in detail in a concrete embodiment.

A particularly advantageous development of the afore described embodiments of the inventive device is characterized in that the at least two filters can be brought additionally into a third position, in which a section of the connecting canal, the section being located upstream of the filter, meaning thus a section of the connecting canal being arranged between the fluid-supplying canal and the filters, can be connected with a sluice that can be opened to the atmosphere. This sluice causes the fact that the fluid can be drained from the device without getting in contact with the filters. Such a third position is particularly desired when in the beginning of the production highly soiled fluid containing residues has to be drained from the device, so that the filters do not get extremely soiled directly in the beginning.

When in the afore described embodiment of the inventive device the at least two filters are arranged in a connecting canal extending through an axially shiftable bolt, then it is possible to locate the sluice in that way that filter can be brought into the third position by an axial shifting of the bolt across the flow direction.

In a development of the afore described embodiment the fluid supply into the fluid-draining canal is interrupted in the third position, which warrants that the strongly soiled fluid does not get in contact with the at least two filters, but that it is drained directly by means of the sluice.

Advantageous developments of the inventive device are indicated in the subclaims.

The afore mentioned and subsequently described inventive device is particularly used to filter molten plastics.

The inventive device is subsequently described more detailed in three embodiments in connection with the drawings.

BRIEF DESCRIPTION OF THE DRAWINGS

The figures show:

FIG. 1A–FIG. 1D a sectional view of a first embodiment of the device in different operating positions;

FIG. 2A–FIG. 2D a sectional view of a second embodiment of the device in different operating positions; and FIG. 3A–FIG. 3D a sectional view of a third embodiment of the device in different operating positions.

In the different figures the same parts are designated with the same numbers.

Figure 1C:
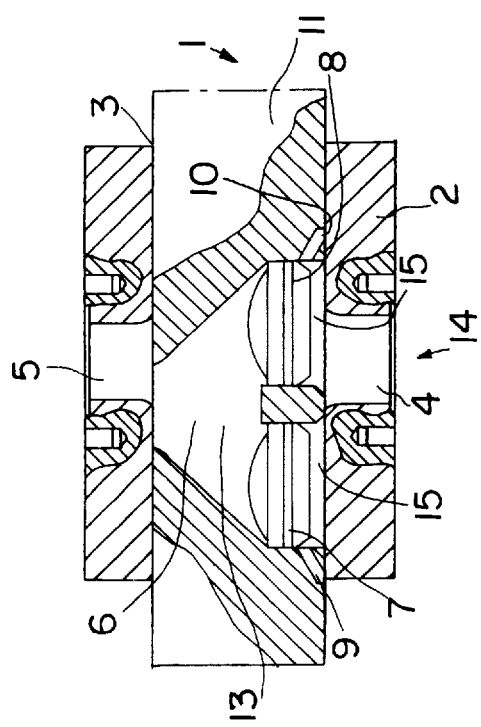

The first embodiment of the device designated with 1 shown in FIG. 1A to 1D comprises a housing 2, whereby a cylindrical bore 3 taking up the cylindrical bolt 11 is arranged within the housing 2. Hereby the bolt 11 is adapted to the bore 3 is such a way that it can be axially shifted in the direction of the arrow 12 and vice-versa, without the undesired effects of fluid emerging from the device 1.

Moreover, the housing 2 of the device 1 comprises a fluid-supplying canal 4 and a fluid-draining canal 5, whereby the fluid-supplying canal 4 is connected with the fluid-draining canal 5 by a single connecting canal 6. In the area of the fluid-supplying canal 4 the connecting canal 6 has a funnel-shaped extension 13, whereby two plate-like filters 7 and 8 are arranged within the funnel-shaped extension 13 of the connecting canal 6. Hereby these plate-like filters 7 and 8 extend essentially across the flow direction of the fluid designated with 14. A connecting canal section 15 is located upstream of the two filters 7, respectively 8 and downstream of the fluid-supplying canal 4.

Each connecting canal section 15 can be connected with the atmosphere by a drain canal 9, respectively 10, located at the connecting canal section.

The embodiment of the device 1 shown in FIGS. 1A to 1D operates as follows:

To set in or to exchange the filter 7 and 8, the bolt 11 is moved from its position as it is shown in FIG. 1B, into a position, as this is shown in FIG. 1A, by an axial shifting in the opposite direction of the arrow 12. In this position of the bolt 11, the filters 7 and 8 are thus freely accessible from the outside, so that also the filters can be exchanged.

From the position shown in FIG. 1A the filters 7 and 8 are then brought into a position as it is shown in FIG. 1B, by axially shifting the bolt 11 in direction of the arrow 12. In this position having been called above the first position of the filters 7 and 8, both filters are superfused with the fluid supplied by the fluid-supplying canal 4 in direction of the arrow 14, so that this fluid is then drained over the fluid-draining canal 5 after leaving the connecting canal 6 as filtered fluid.

If after a certain operating period it is observed that, for example, the filter 7 is soiled, the bolt 11 is moved in the opposite direction of the arrow 12 from the position shown in FIG. 1B into a position as it is indicated in FIG. 1C. This position was called above also the second position.

Figure 1D:
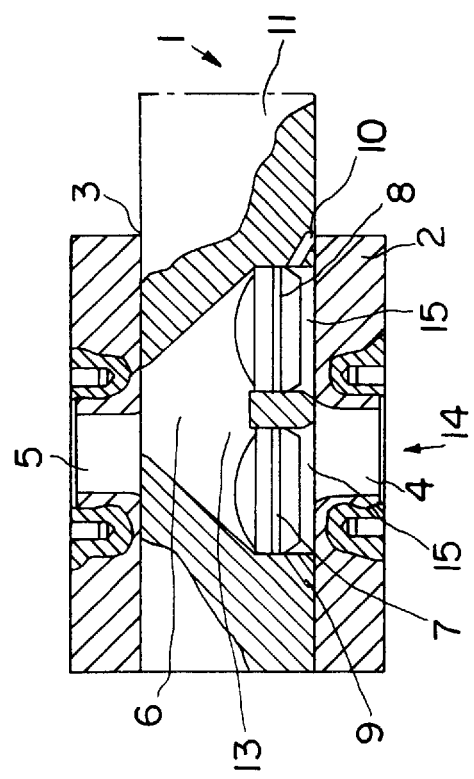

In this second position (position of regeneration), as it is shown FIG. 1C for the filter 7 and in FIG. 1D for the filter 8, the fluid is supplied by the fluid-supplying canal 4 in the direction of the arrow 14, then superfuses the filter 8 and emerges as filtered fluid downstream of the filter 8 in the connecting canal 6. Depending on the fact that the tool or the nozzle located downstream of the fluid-draining canal 5 build up a counter-pressure and that furthermore the total surface of the connecting canal outlet is not aligned with the fluid-draining canal, only a partial flow of the filtered fluid is drained over the fluid-draining canal 5, whereas a further partial flow superfuses the filter 7 in the opposite flow direction 14. After superfusing the filter 7, the fluid charged with particles emerging from the filter surface of the filter 7 is drained into the atmosphere over the drain canal 9, as this is shown in FIG. 1C.

After regenerating the filter 7, the bolt 11 is axially shifted in the direction of the arrow 12, so that then again both filters can be used for filtering, as this is shown in FIG. 1B.

The filter 8 is regenerated in an analogue manner as it is described above for the filter 7. Hereby, however, the bolt 11 is shifted axially to the direction of the arrow 12 into a position as it is indicated in FIG. 1D. The fluid entering over the fluid-supplying canal 4 in the direction of the arrow 14 is firstly filtered over the filter 7 in its position of regeneration or its backwashing position, shown in FIG. 1D, whereby a first partial flow of the filtered fluid is drained from the device 1 over the fluid-draining canal. Depending on the counter-pressure a second partial flow of the filtered fluid flows in the opposite flow direction 14 of the fluid during the filtering process and superfuses the filter 8, which leads to the fact that correspondingly deposited particles are removed from this filter, so that subsequently a soiled fluid can be led over the drain canal 10 from the section 15 of the connecting canal into the atmosphere. After backwashing the filter 8, the bolt 11 is axially shifted in the opposite direction of the arrow 12 and into a position as it is shown FIG. 1B, whereby in this position, called above also first position, both filters filter the fluid entering the fluid-supplying canal 4 in the direction of the arrow 14.

The second and third embodiment of the device 1 shown in FIGS. 2A to 2D as well as in 3A to 3D differs from the above described first embodiment (FIGS. 1A–1D) only in the form and the arrangement of the drain canals 20 and 21 (FIGS. 2A–2D), respectively 30 and 31 (FIGS. 3A–3D).

The second and third embodiment of the device 1 described in FIGS. 2A–2D and FIGS. 3A–3D operates exactly as this is described above in connection with the FIGS. 1A–1D for the first embodiment of the device 1. FIG. 2A and 3A thus show an operating position of the device 1 in which the filters 7 and 8 are freely accessible, so that the filters can correspondingly be exchanged.

FIGS. 2B and 3B represent an operating position in which both filters 7 and 8 filter the fluid flowing in the direction of the arrow 14, whereas FIGS. 2C and 3C show an operating position in which filter 7 is regenerated, respectively backwashed, in such a way that a partial flow of the fluid filtered already by filter 8 superfuses filter 7 and that thus soiled particles are removed from the filter surface, whereby then the fluid charged with soiled particles is drained over section 15 out of the device 1 through the drain canal 20, respectively drain canal 30, into the atmosphere.

FIGS. 2D and 3D show an operating position in which the filter 8 is regenerated, respectively backwashed, whereby this is achieved by the fact that a partial flow of the fluid filtered by filter 7 superfuses filter 8 in the opposite flow direction (direction of the arrow 14) and that thus the soiled particles are removed from filter 8, so that subsequently the fluid charged with the soiled particles is drained into the atmosphere over the drain canal 21, respectively 31.

The drain canals 21, respectively 22, shown in the FIGS. 2A–2D are arranged within the housing section 2, whereas the drain canals 30, respectively 31, shown in the FIGS. 3A–3D are located at the outside of the housing section 2.

I claim:

1. A device for filtering a fluid, comprising
   a housing,
   a single fluid supplying canal and a fluid draining canal in said housing,
   a single connecting canal which connects said fluid supplying canal to said fluid draining canal so that said fluid to be filtered flows in a flow direction from said fluid supplying canal to said fluid draining canal through said connecting canal,
   at least first and second substantially flat filters movably arranged in said single connecting canal and across said flow direction,
   said connecting canal comprising a funnel-shaped extension which receives said first and second filters,
   said first and second filters being simultaneously movable between a first position in which said single connecting channel communicates with said fluid draining channel and said fluid is filtered by said first and second filters, and a second position in which said single connecting channel still communicates with said fluid draining channel and said fluid is filtered by one of said filters while the other of said filters is superfused with said fluid in an opposite flow direction,
   wherein in said second position, the portion of said fluid which passes through the other of said filters in said opposite flow direction is drained from said device through a drain channel,
   wherein said connecting canal is arranged in a cylindrical bolt, said cylindrical bolt is disposed fluid-tight in a housing bore which extends vertically to said flow direction of said fluid, said connecting canal extends through the entire diameter of said bolt, said filters are movably supported and located on said bolt, and said bolt is movable across said flow direction of said fluid so that said filters can be moved between said first and second positions by shifting of said bolt.

2. The device of claim 1 wherein said fluid to be filtered is a molten plastic.

3. The device of claim 1 wherein said connecting canal is oriented so that the large diameter portion of said funnel-shaped extension is directed towards said fluid supplying canal.

4. The device of claim 1 wherein said drain channel connects a section of said connecting canal to the atmosphere, said section of said connecting canal being located upstream of said filters to the atmosphere.

5. The device of claim 4 comprising drain channels associated with each of said filters.

6. The device of claim 5 wherein said drain channels are arranged in said bolt.

7. The device of claim 5 wherein said drain channels are arranged in a section of said housing which also contains said fluid supplying canal.

8. The device of claim 5 wherein said drain channels are located on the outside of a section of said housing which contains said fluid supplying canal.

9. The device of claim 1 wherein said filters are movable into a third position in which a section of said connecting canal located upstream of said filters can be connected to the atmosphere by a sluice.

10. The device of claim 9 wherein said filters can be moved into said third position by shifting of said bolt across said flow direction.

11. The device of claim 10 wherein the supply of fluid to said fluid draining canal is interrupted in said third position of said filters.

* * * * *